United States Patent [19]

Hayashi

[11] Patent Number: 4,548,183
[45] Date of Patent: Oct. 22, 1985

[54] OPERATIONAL MODE RESPONSIVE HEATING ARRANGEMENT FOR INTERNAL COMBUSTION ENGINE INDUCTION SYSTEM

[75] Inventor: Yoshimasa Hayashi, Kamakura, Japan

[73] Assignee: Nissan Motor Co., Ltd., Yokohama, Japan

[21] Appl. No.: 602,448

[22] Filed: Apr. 20, 1984

[30] Foreign Application Priority Data

Apr. 27, 1983 [JP] Japan .................................. 58-73001

[51] Int. Cl.[4] ............................................. F02M 31/00
[52] U.S. Cl. .................................... 123/547; 123/545; 123/552; 123/41.15; 123/41.21
[58] Field of Search ............... 123/547, 552, 548, 545, 123/412, 41.21, 41.22, 41.24, 41.27, 41.08; 73/290 R

[56] References Cited

U.S. PATENT DOCUMENTS

| | | | |
|---|---|---|---|
| 1,736,003 | 11/1929 | Gould | 123/545 |
| 1,787,562 | 1/1931 | Barlow | |
| 1,822,147 | 9/1931 | Horning | 123/545 |
| 3,385,940 | 5/1968 | Roper | 123/41.15 |
| 3,714,933 | 2/1973 | Ozaki | 123/552 |
| 4,005,693 | 2/1977 | Masaki | 123/552 |
| 4,426,972 | 1/1984 | Kimura | 123/552 |
| 4,452,215 | 6/1984 | Glass | 123/552 |

FOREIGN PATENT DOCUMENTS

| | | | |
|---|---|---|---|
| 56-32071 | 4/1981 | Japan . | |
| 197827 | 5/1923 | United Kingdom | 123/545 |

*Primary Examiner*—Ronald H. Lazarus
*Attorney, Agent, or Firm*—Schwartz, Jeffery, Schwaab, Mack, Blumenthal & Evans

[57] ABSTRACT

In an engine system wherein the engine coolant is permitted to boil and the gaseous coolant used as a vehicle for removing heat from the engine, a heating jacket associated with the induction conduit of the engine is supplied with gaseous coolant via a control valve during cold engine starts and during modes of engine operation wherein it is advantageous from the view point of fuel economy to raise the temperature of the engine and/or the incoming fuel charge. The supply is terminated under other modes of operation to avoid heating the incoming charge and reducing charging efficiency.

4 Claims, 5 Drawing Figures

OPERATIONAL MODE RESPONSIVE HEATING ARRANGEMENT FOR INTERNAL COMBUSTION ENGINE INDUCTION SYSTEM

BACKGROUND OF THE INVENTION

1. Field of the Invention

The present invention relates generally to an internal combustion engine and more specifically to an induction system heating arrangement which is load responsive.

2. Description of the Prior Art

One well known method of heating an incoming charge (air or air-fuel mixture) flowing through the induction manifold toward the combustion chamber or chambers of the engine, includes directing some of the engine exhaust gases into a heating chamber formed about a suitable portion of the manifold (usually the riser bottom) and controlling the temperature to which the manifold rises using a temperature responsive bimetallic strip to operate a flap or like arrangement which throttles the amount of exhaust gas circulated through the chamber. However, this arrangement has suffered from the drawback that the temperature of the exhaust gases, due to the heating of the incoming charge, tend to be insufficient during engine warm-up and/or low temperature operations, to promote adequate oxidation of noxious components (e.g. HC and CO) in purifying device such as catalytic converters etc.

Another well known method of heating the induction manifold takes the form of circulating some of the water from the coolant jacket through a jacket formed along the bottom of the induction manifold. This, while solving the above mentioned exhaust gas purification problem has encountered drawbacks in that efficient heating is not possible until the bulk of the coolant (water or the like) has been heated to a temperature whereat a useful amount of heat exchange is possible and in that additional energy is required by the coolant circulation pump to circulate the coolant through the additional chambering. Thus, during cold engine starts effective heating and carburetion of the air-fuel mixture fed to the combustion chambers is poor. Further, once the engine has warmed up, the heating continues irrespective of the mode of engine operation, degrading the charging efficiency of the engine during high speed and high load operation.

One attempt to overcome the above mentioned problems has been proposed in Japanese First Provisional Publication Sho 56-32071. In this arrangement each of the cylinder liners and structure defining the cylinder heads are covered in porous ceramic layers which act as wicks. Engine coolant is supplied to the coolant jacket wherein it is absorbed by the layers and subsequently converted to its gaseous form. The incoming charge is heated by some of the gaseous coolant which is permitted to pass through conduit 11 into a heating chamber 12 located beneath the induction manifold riser.

However, this arrangement has proven impractical in that it suffers from the notable drawbacks that adequate cooling of the engine is not possible and the ceramic layers readily undergo thermal damage and in that the incoming charge is heated during all modes of engine operation.

SUMMARY OF THE INVENTION

It is an object of the present invention to provide a heating arrangement for an the induction system of an internal combustion engine which obviates the need for a power consuming coolant circulation pump of the nature used in conventional water cooled engines, which enables the heating of the incoming charge very shortly after a cold engine start and which discontinues heating during modes of engine operation other than those wherein it is desirable from the point of fuel economy and the like.

In brief, the above object is fullfilled via an engine system in which the engine coolant is permitted to boil and the gaseous coolant used as a vehicle for removing heat from the engine, and wherein a heating jacket associated with the induction conduit of the engine is supplied with some of the gaseous coolant via a control valve during cold engine starts and during modes of engine operation wherein it is advantageous from the view point of fuel economy and the like to raise the temperature of the incoming fuel charge. The supply is terminated under other modes of operation to avoid heating the incoming charge and reducing charging efficiency.

More specifically, the present invention takes the form of an internal combustion engine having (a) a coolant jacket into which coolant is introduced in a liquid state and discharged in a gaseous form and (b) an induction system including an induction conduit leading to a combustion chamber of the engine and which features a heating jacket for heating the induction conduit, the jacket having an inlet port in fluid communication with the coolant jacket and an outlet port, a valve for controlling fluid communication between the inlet port and the coolant jacket, a control device responsive to the operating condition of the engine for operating the valve in a manner to open the valve and allow gaseous coolant from the coolant jacket to enter the jacket and heat the conduit by releasing the latent heat of evaporation thereof, when the engine is in a predetermined mode or modes of operation.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
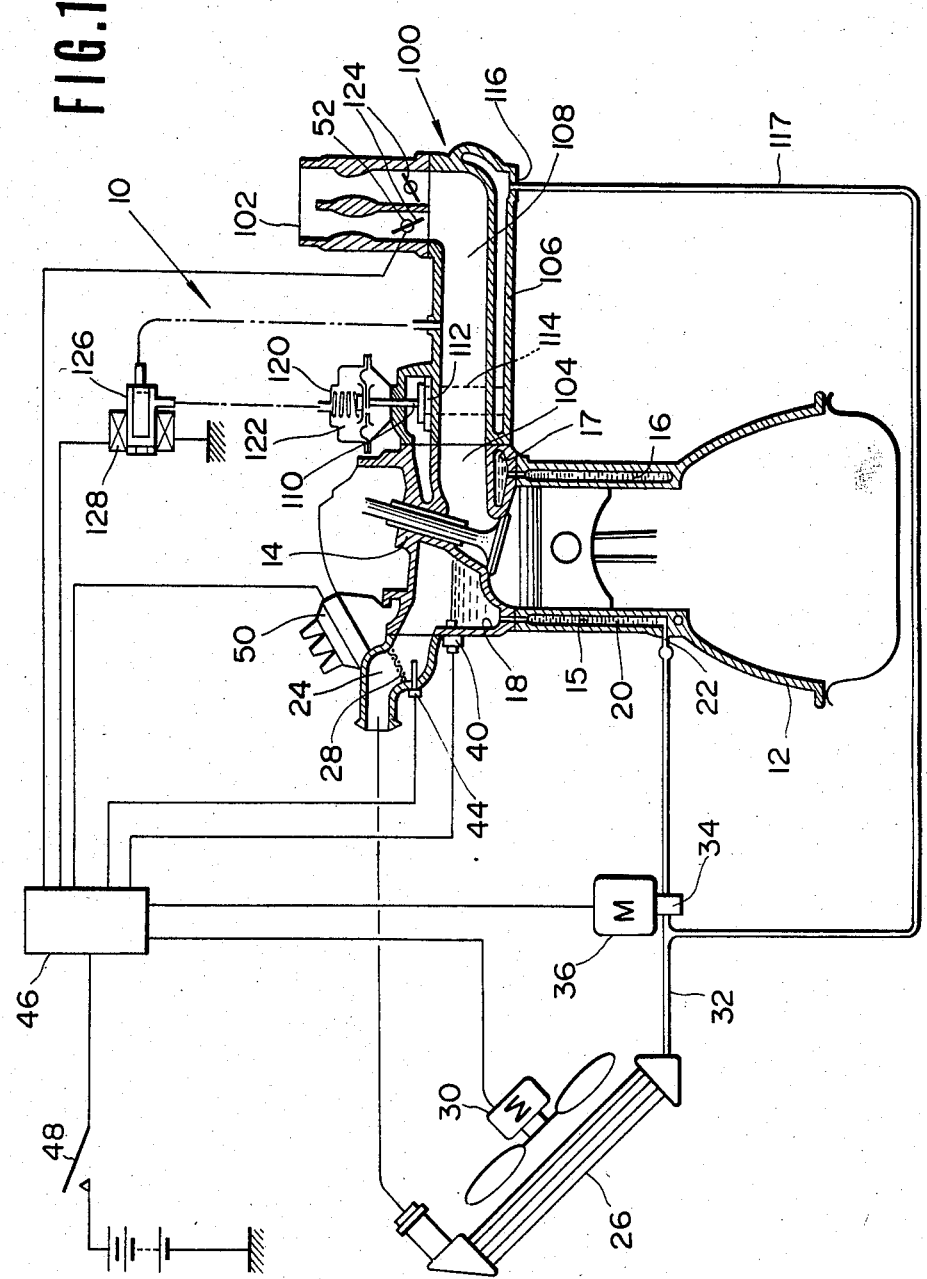
FIG. 1 schematically shows an engine system incorporating an embodiment of the present invention.

FIG. 1 shows schematically an engine system incorporating an embodiment of the present invention. In this arrangement an internal combustion engine 10 includes a cylinder block 12 on which a cylinder head 14 is detachably secured. The cylinder head and cylinder block include suitable cavities 15 - 18 which define a coolant jacket 20. The coolant is introduced into the coolant jacket 20 through a port 22 formed in the cylinder block 12. In this embodiment port 22 is arranged to communicate with a lower level of the coolant jacket 20.

Fluidly communicating with a vapor discharge port 24 of the cylinder head 12 is a radiator 26 (heat exchanger). Disposed in the vapor discharge port 24 is a separator 28 which in this embodiment takes the form of a mesh screen. The separator 28 serves to separate the droplets of liquid and/or foam which tend to be produced by the boiling action, from the vapor per se and minimize unecessary liquid loss from the coolant jacket.

Located suitably adjacent the radiator 26 is an electrically driven fan 30. Disposed in a coolant return conduit 32 is a return pump 34. In this embodiment, the pump is driven by an electric motor 36.

In order to control the level of coolant in the coolant jacket, a level sensor 40 is disposed as shown. It will be noted that this sensor is located at a level higher than that of the combustion chambers, exhaust ports and valves (viz., structure subject to high heat flux) so as to maintain same securely immersed in coolant and therefore attenuate engine knocking and the like due to the formation of localized zones of abnormally high temperature or "hot spots".

Located above the level sensor 40 so as to be exposed to the gaseous coolant is a temperature sensor 44 (alternatively a pressure sensor may be used). The output of the level sensor 40 and the temperature sensor 44 are fed to a control circuit 46 or modulator which is suitably connected with a source of EMF upon closure of a switch 48. This switch of course may advantageously be arranged to be simultaneously closed with the ignition switch of the engine (not shown).

The control circuit 46 further receives an input from the engine distributor 50 indicative of engine speed and an input from a load sensing device 52 such as a throttle position sensor. It will be noted that as an alternative to throttle position, the output of an air flow meter or an induction vacuum sensor may be used to indicate load.

Figure 3:
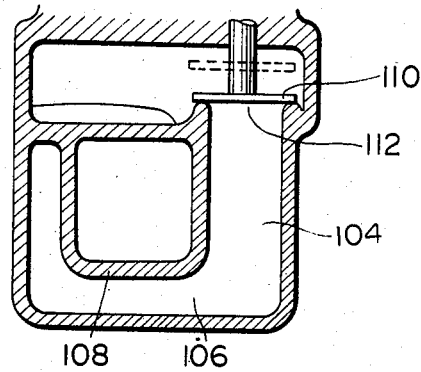
FIG. 3 is a sectional view showing the arrangement of the control valve and induction manifold shown in FIG. 1.

An induction manifold 100 is arranged to interconnect a carburetor 102 and the induction port or ports 104 of the engine 10. A heating jacket 106 is formed about the branch runner or runners 108 of the manifold as shown in FIGS. 1 and 3. A control valve 110 is arranged to control an inlet port 112 of the heating jacket 106 via which fluid communication between the coolant jacket 20 formed in the cylinder head 14 and the heating jacket 106 is established. It will be noted that the level of the inlet port 112 is above that at which the level of liquid coolant is maintained by the level sensor 40 so as to ensure that gaseous coolant will be predominately fed into the heating jacket 106. In the illustrated embodiment a vertically extending conduit 114 is formed in the manifold 100 to lead the gaseous coolant from the inlet port 112 into the lower portion of the heating jacket 106. A drain port 116 is formed at a location distal from the inlet port 112. The drain port 116 fluidly communicates via a conduit 117 with the return conduit 32 at a location upstream of the pump 34. With this arrangement the gaseous coolant which condenses in the heating jacket 106 (releasing its latent heat of evaporation) is returned to the coolant jacket 20 during the periodic energizations of the pump 34.

A vacuum motor 120 is operatively connected with the control valve 110. The vacuum chamber 122 of this motor is arranged to be selectively connectable with either a source of vacuum (in this case the induction manifold 100 at a location downstream of the throttle valve or valves 124) or the ambient atmosphere via a three-way electromagnetic valve 126. The solenoid coil 128 of the three-way valve 126 is connected with the control circuit 46 in a manner to be energized to establish communication between the vacuum chamber 122 and the induction manifold 100 when the engine is operating under conditions which shall be termed "urban cruising" and de-energized to establish communication between the atmosphere and the chamber when the engine is operating under relatively high load and high engine speed conditions. This control will become clear hereinlater.

Figure 2:
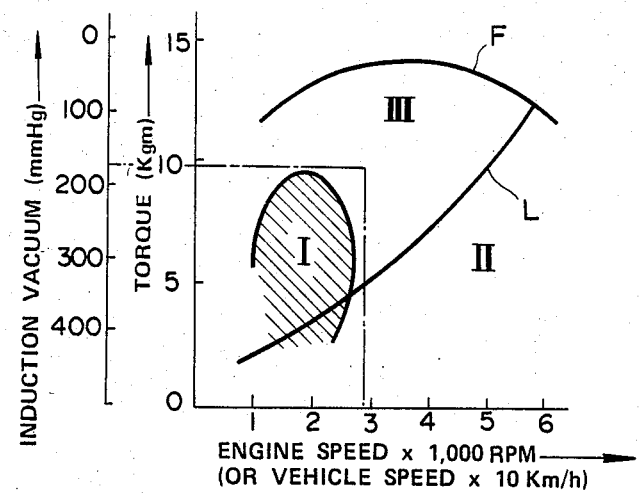
FIG. 2 is a graph showing in terms of engine load (torque and induction vacuum) and engine speed (RPM) the various load zones in which heating of the incoming charge is and is not required.

FIG. 2 graphically shows in terms of engine torque and engine speed the various load "zones" which are encountered by an automotive vehicle engine. In this graph, the the curve F denotes full throttle torque characteristics, trace L denotes the resistance encountered when a vehicle is running on a level surface, and zones I, II and III denote respectively "urban cruising", "high speed cruising" and "high load operation" (such as hillclimbing, towing etc.).

As will be apparent from this figure, when the engine is operating within a predetermined engine speed and load limits (for example 2500-3000 RPM and 8-10 Kgm of torque or, alternatively 150-200 mm Hg.), which define a field including the "urban cruising" zone, it is preferable as previously mentioned to heat the incoming charge to promote both an increase the carburetion of the charge prior entry into the combustion chamber or chambers and to elevate the temperature thereof during the compression phase prior to ignition. Outside of this field it is advantageous to terminate the heating of the incoming charge so as to avoid a reduction in charging efficiency.

Figure 4:
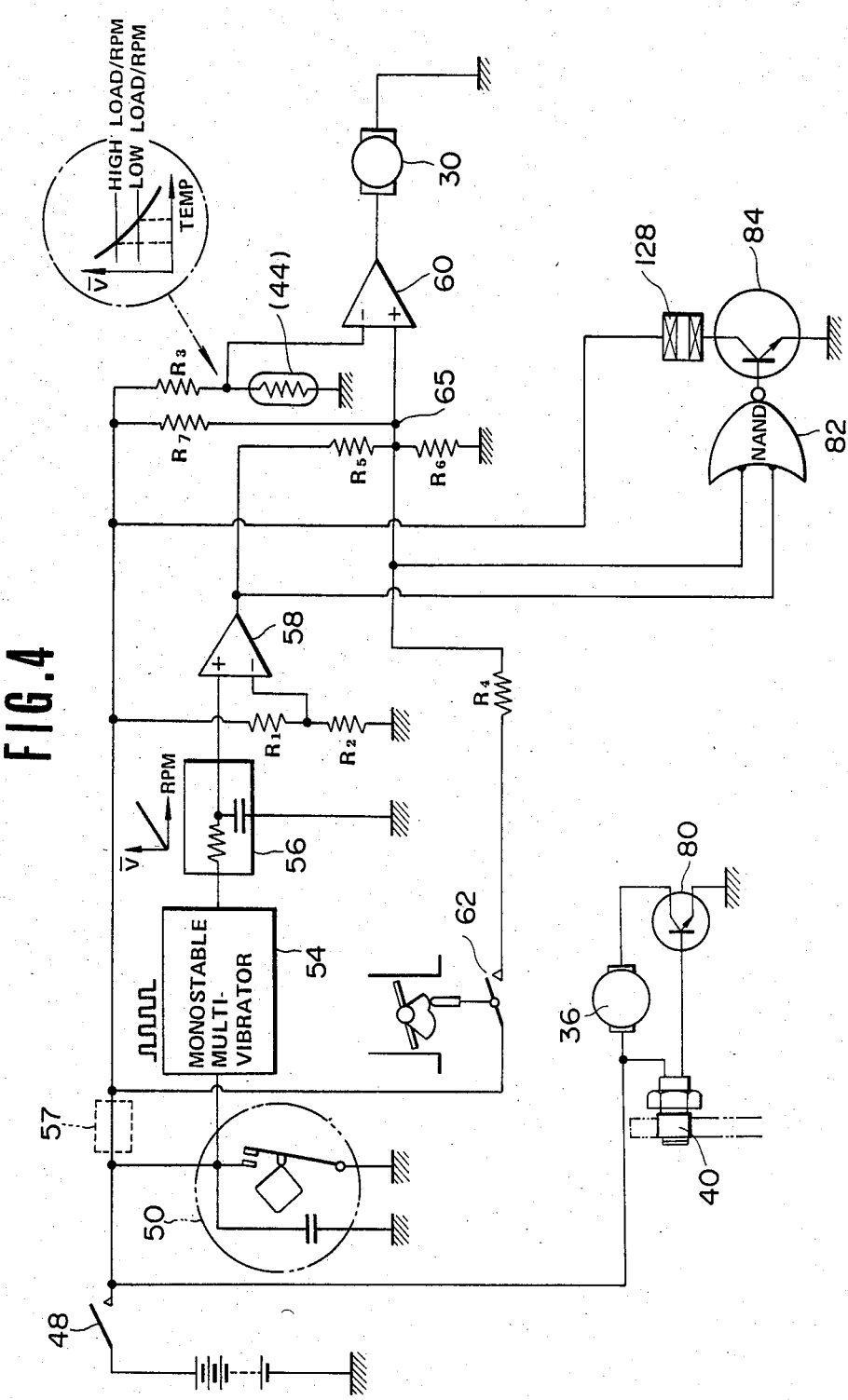
FIG. 4 shows a circuit suitable for controlling the two-way valve and other apparatus shown in FIG. 1.

FIG. 4 shows an example of circuitry which may be used to control the pump and the solenoid of the two-way valve. In this circuit arrangement the distributor 50 of the engine ignition system is connected with the source of EMF (FIG. 1) via the switch 48. A monostable multivibrator 54 is connected in series between the distributor 50 and a smoothing circuit 56. A DC—DC converter 57 is arranged, as shown in broken line, to ensure a supply of constant voltage to the circuit as a whole. A voltage divider consisting of resistors R1 and R2 provides a comparator 58 with a reference voltage at one input thereof while the second input of said comparator receives the output of the smoothing circuit 56. A second voltage dividing arrangement consisting of a resistor R3 and a thermistor (viz., the temperature sensor 44) applies a reference voltage to a second comparator 60 which also receives a signal from a cam operated throttle switch 62 via a resistor arrangement including resistors R4, R5, R6 and R7 connected as shown. The output of the comparator 60 is applied to the fan for energizing same.

The circuit further includes a transistor 80 which acts a switch upon receiving an output from the level sensor 40 to establish a circuit between the source of EMF and ground. As a safety measure, an inverter or the like (not shown) may be interposed between the level sensor 40 and the transistor 80, and the level sensor adapted to produce an output when immersed in coolant. With this arrangement should the level sensor malfunction, the lack of output therefrom would cause the transistor 80 to be rendered conductive and the pump 36 energized to overfill the coolant jacket.

A NAND gate 82 is arranged to receive the outputs of the comparator 58 and the throttle valve switch 62 and to, upon both of the inputs assuming a low level (indicating that the engine is operating at an engine speed and load lower than the levels whereat the comparator outputs a high level and the switch 62 is closed) to render transistor 84 conductive in a manner to energize solenoid coil 128 and open the control valve 110.

Figure 5:
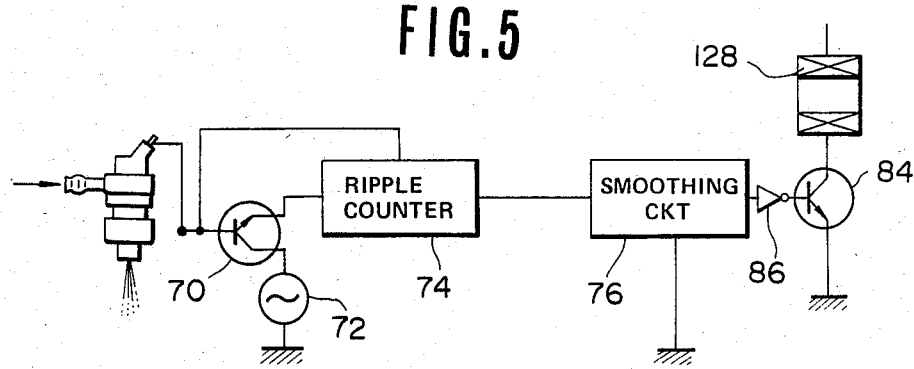
FIG. 5 shows in part an alternative circuit arrangement which can be used to control the two-way valve.

FIG. 5 shows an alternate circuit arrangement which may be used to control the two-way valve 126. This alternative arrangement includes a transistor 70, a clock circuit 72, a ripple counter 74, a smoothing circuit 76, and an inverter 86, all connected as shown. Due to the fact that the frequency of injection control pulses varies with engine speed and the voltage output of the smoothing circuit varies with pulse width as well as the frequency of injection, it is possible to use this arrangement in place of both of the throttle switch 62 and distributor 50 as will be appreciated by those skilled in the art. The output of the smoothing circuit may be applied to the base of the transistor 84 via inverter 86 to acheive the desired control.

The instant invention finds particular application in Diesel engines wherein, by heating the incoming flow of air during cold engine starts and/or low engine temperature operation, the characteristic noise of such engines is remarkably reduced. The reason for this improvement is due to the fact that the temperature of the charge at the final stage of the compression phase (prior spontaneous or self ignition) $T_2$ is given by the following equation:

$$T_2 = (\rho^{\gamma-1} T_1)$$

wherein:

$T_1$: is the temperature of the air in the combustion chamber at the initial stage of the compression phase, $\rho$: is the compression ratio of the engine (approximately 20:1), and $\gamma$: is the specific heat ratio (1.4).

It will be seen that by raising the initial temperature of of the air ($T_1$) a notable increase in $T_2$ occurs. This increase in temperature tends to attenuate the extremely rapid increase in temperature and pressure which occurs when the atomized fuel spontaneously ignites in the combustion chamber with a slight delay under "cold" conditions and thus reduces the attendant "knocking" which results therefrom. Viz., as the temperature during the final stage of compression is increased the delayed ignition of the atomized fuel is suppressed attenuating the characteristic Diesel noise.

What is claimed is:

1. In an internal combustion engine having (a) a coolant jacket into which coolant is introduced in a liquid state and discharged in a gaseous form and (b) an induction system including an induction conduit leading to a combustion chamber of the engine:

a radiator in fluid communication with said coolant jacket for receiving gaseous coolant therefrom and condensing same to its liquid state;

means for defining a heating jacket for heating said induction conduit, said heating jacket having an inlet port in fluid communication with said coolant jacket and an outlet port;

a level sensor for sensing the level of liquid coolant in said coolant jacket, said level sensor being located at a level above said combustion chamber and below that of said inlet port:

a pump responsive to said level sensor for returning the condensed liquid coolant to said coolant jacket via a return conduit, said outlet port of said heating jacket fluidly communicating with said return conduit upstream of said pump;

a valve for controlling fluid communication between said inlet port and said coolant jacket;

a control device responsive to an operating condition of said engine for operating said valve in a manner to open said valve and allow gaseous coolant from said coolant jacket to enter said heating jacket and heat said conduit by releasing the latent heat of evaporation thereof, when said engine is operating in a predetermined mode.

2. An internal combustion engine as claimed in claim 1, further comprising:

an engine speed sensor;

an engine load sensor; and a control circuit for issuing a control signal to said valve when said sensors indicate said engine is operating in said predetermined mode.

3. An internal combustion engine as claimed in claim 2, wherein said valve includes a vacuum motor and a solenoid controlled valve which selectively connects said vacuum motor with one of said induction conduit and a source of air at atmospheric pressure when said control circuit issues said control signal.

4. An internal combustion engine as claimed in claim 3, wherein said engine operates in said predetermined mode said engine speed is lower than a first predetermined level and said engine load is below a second predetermined level.

* * * * *